(12) United States Patent
Yoshida

(10) Patent No.: US 8,760,092 B2
(45) Date of Patent: Jun. 24, 2014

(54) MOTOR CONTROL APPARATUS

(71) Applicant: Denso Corporation, Kariya (JP)

(72) Inventor: Takuya Yoshida, Kariya (JP)

(73) Assignee: Denso Corporation, Kariya (JP)

( * ) Notice: Subject to any disclaimer, the term of this patent is extended or adjusted under 35 U.S.C. 154(b) by 15 days.

(21) Appl. No.: 13/742,956

(22) Filed: Jan. 16, 2013

(65) Prior Publication Data

US 2013/0200826 A1 Aug. 8, 2013

(30) Foreign Application Priority Data

Feb. 7, 2012 (JP) .................................. 2012-023577

(51) Int. Cl.
*H02P 6/04* (2006.01)
(52) U.S. Cl.
USPC ............... 318/400.11; 318/400.09; 318/400.4
(58) Field of Classification Search
USPC ............................. 318/400.11, 400.09, 400.4
See application file for complete search history.

(56) References Cited

U.S. PATENT DOCUMENTS

| 4,599,545 | A | * | 7/1986 | Moriki et al. ................. 388/813 |
| 4,999,558 | A | * | 3/1991 | Onodera et al. ............. 318/685 |
| 5,412,302 | A | * | 5/1995 | Kido et al. .................... 318/685 |
| 5,668,679 | A | * | 9/1997 | Swearingen et al. ........... 360/75 |
| 7,962,049 | B2 | * | 6/2011 | Mateosky et al. ............. 398/208 |
| 2009/0108791 | A1 | | 4/2009 | Isobe et al. |
| 2013/0141031 | A1 | * | 6/2013 | Yamada ........................ 318/603 |

FOREIGN PATENT DOCUMENTS

| JP | 2001-327187 | 11/2001 |
| JP | 2004-129451 | 4/2004 |
| JP | 2004-140962 | 5/2004 |

OTHER PUBLICATIONS

Office Action (2 pages) dated Jan. 22, 2014 issued in corresponding Japanese Application No. 2012-023577 and English translation (3 pages).

* cited by examiner

*Primary Examiner* — Erick Glass
(74) *Attorney, Agent, or Firm* — Nixon & Vanderhye PC

(57) ABSTRACT

A motor control unit determines whether a rotor of an electric motor is in rotation or not after the motor control unit is started up but before an initial operation, based on an encoder count value after the start-up of the motor control unit. When the electric motor is stopped, the initial operation is carried out so as to learn a correction value of phase difference between the encoder count value and an actual current-supply phase. When the electric motor is still rotated due to its inertia, a motor-stop control is carried out before the initial operation in order to completely stop the rotation of the rotor. In the motor-stop control, electric power is supplied to windings of two phases at the same time.

4 Claims, 4 Drawing Sheets

MOTOR CONTROL APPARATUS

CROSS REFERENCE TO RELATED APPLICATION

This application is based on Japanese Patent Application No. 2012-023577 filed on Feb. 7, 2012, the disclosure of which is incorporated herein by reference.

TECHNICAL FIELD

The present disclosure relates to a motor control apparatus, according to which an initial operation is carried out after a start-up of the motor control apparatus so as to change current-supply phases of an electric motor in an open-loop control so that the motor control apparatus learns a correction value for a phase difference between the current-supply phase and a count value of an encoder counter.

BACKGROUND

In recent years, a shift-range changing device of an automatic transmission apparatus for a vehicle of a so-called shift-by-wire type has been researched and developed. For example, as disclosed in Japanese Patent Publications No. 2004-129451 and No. 2009-112151, a range-change operation of a vehicle driver (an operation of a shift lever) is detected by switches or the like and an electric motor is controlled based on a detection signal thereof so as to control a shift range of a range-change mechanism at a desired range position.

According to the above prior art apparatus (for example, JP No. 2009-112151, which corresponds to US 2009/0108791 A1), an encoder outputs a pulse signal for a predetermined angle in synchronism with rotation of an electric motor. When the shift range is changed, the output pulses from the encoder are counted and the electric motor is rotated based on a count value of an encoder counter (hereinafter, an encoder count value) to a target rotational position (corresponding to a target count value), so that a range position of the range-change mechanism is moved to a target range position.

In the electric motor of this kind having the encoder, it is only possible to detect a rotational amount (a rotational angle) of a rotor from its initial position based on the encoder count value after the start-up of the apparatus. It is, therefore, necessary to detect in some way an absolute rotational position of the rotor after the apparatus and/or system is turned on to start up its operation, in order to correct phase difference between the encoder count value and the rotational position of the rotor (corresponding to a current-supply phase). Otherwise, it is difficult to normally operate the electric motor.

According to the above prior art apparatus or system, current supply to stator coils of respective phases is sequentially changed in a open-loop control during an initial operation after the start-up of the apparatus or the system. In the above initial operation, since the current supply to the respective stator coils is carried out at least for one cycle at a predetermined time schedule, the rotational position of the rotor and a corresponding current-supply phase coincide with each other at one of the phases of the stator coils. The encoder count value at such a timing is memorized. A correction value for the phase difference (a correction value for initial-position difference) is calculated based on a relationship between the encoder count value at the end of the initial operation and the current-supply phase. In a subsequent normal operation of the electric motor, the encoder count value is corrected by the correction value for the phase difference so as to correctly supply electric power to the respective phases of the stator coils.

The motor control apparatus may happen to be automatically reset from any cause (for example, instantaneous drop of power supply voltage, electric power failure, noises and so on) during the normal operation after the initial operation. When such reset occurs, a learning value (a memorized value) for the correction value of the phase difference disappears. It becomes necessary to carry out a learning process again to calculate the correction value for the phase difference through the initial operation in a case that the apparatus or system is re-started after the reset.

In a normal start of the motor control apparatus after power supply, the initial operation is carried out in a condition that the rotor of the electric motor is stopped. In some of cases for re-starting the motor control apparatus after the reset thereof, the initial operation is carried out in a condition that the rotor of the electric motor is still being in rotation due to its inertia. When the initial operation is carried out in the condition that the rotor of the electric motor is being rotated, the rotor of the electric motor is continuously rotated by its inertia even if the rotational position of the electric motor does not correspond to phases of the electric motor to which the electric current is supplied. As a result, the learning process for the correction value of the phase difference may fail (for example, the learning process is ended due to an error, or a wrong value is learned), and motor operation cannot be normally carried out in a following motor control operation.

In addition to the above situation in which the motor control apparatus is automatically reset due to some reason during the normal operation of the electric motor, this kind of situation may also happen when a power source switch is turned on again shortly after the power source switch has been turned off but before the rotation of the electric motor has not yet been completely stopped.

SUMMARY OF THE DISCLOSURE

The present disclosure is made in view of the above problems. It is an object of the present disclosure to provide a motor control apparatus, according to which a failure of a learning process for correction value of phase difference is prevented in an initial operation, even in a case that a rotor of an electric motor is still being rotated due to its inertia at a start-up timing of the motor control apparatus.

According to a feature of the present disclosure, a motor control system has;

an electric motor for driving a controlled object;

an encoder for outputting pulse signals at predetermined angular positions in synchronism with rotation of the electric motor; and a motor control unit having an encoder counter for counting the pulse signals from the encoder to calculate an encoder count value.

The motor control unit carries out an initial operation after a start-up of the motor control unit, so that current-supply phase of the electric motor is changed in an open-loop control.

The motor control unit carries out a learning process in the initial operation in order to learn a correction value of a phase difference between the current-supply phase and the encoder count value.

In a normal motor operation after the initial operation, the motor control unit corrects the encoder count value by the correction value of the phase difference.

The motor control unit controls power supply to the electric motor so that the current-supply phase is sequentially changed depending on corrected encoder count value, in order to rotate the electric motor to a target position.

The motor control unit determines whether the electric motor is being rotated or not, after the start-up of the motor control unit but before the initial operation.

The motor control unit carries out a motor-stop control, when the motor control unit determines that the electric motor is still being rotated, so as to stop rotation of a rotor of the electric motor before the initial operation.

According to the above feature, when the motor control unit determines that the electric motor is being rotated after the start-up of the motor control unit but before the initial operation, the initial operation is carried out after the motor-stop control. Therefore, when the rotor of the electric motor is rotated by its inertia in the case of the reset of the ECU or in the case that the electric power is supplied again to the motor control unit shortly after turn-off of an ignition switch, the initial operation is carried out after the rotation of the rotor of the electric motor is stopped. It is possible to prevent a failure of the learning process for the correction value of the phase difference.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

The present disclosure will be explained hereinafter by way of an embodiment, in which the present disclosure is applied to a shift-range changing device for an automatic transmission apparatus of a vehicle.

Figure 1:
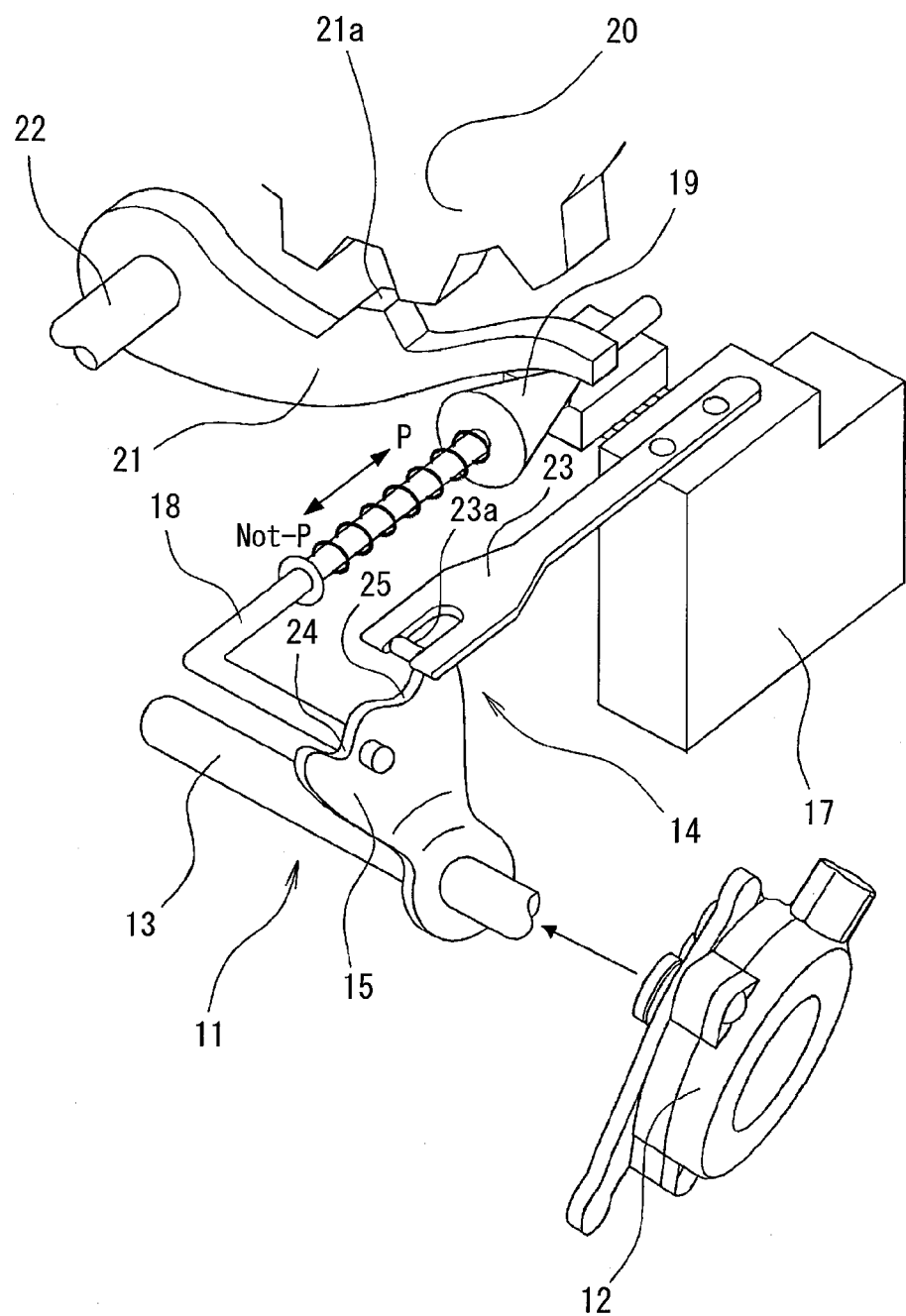
FIG. 1 is a schematic perspective view showing a shift-range changing device according to an embodiment of the present disclosure.
Figure 2:
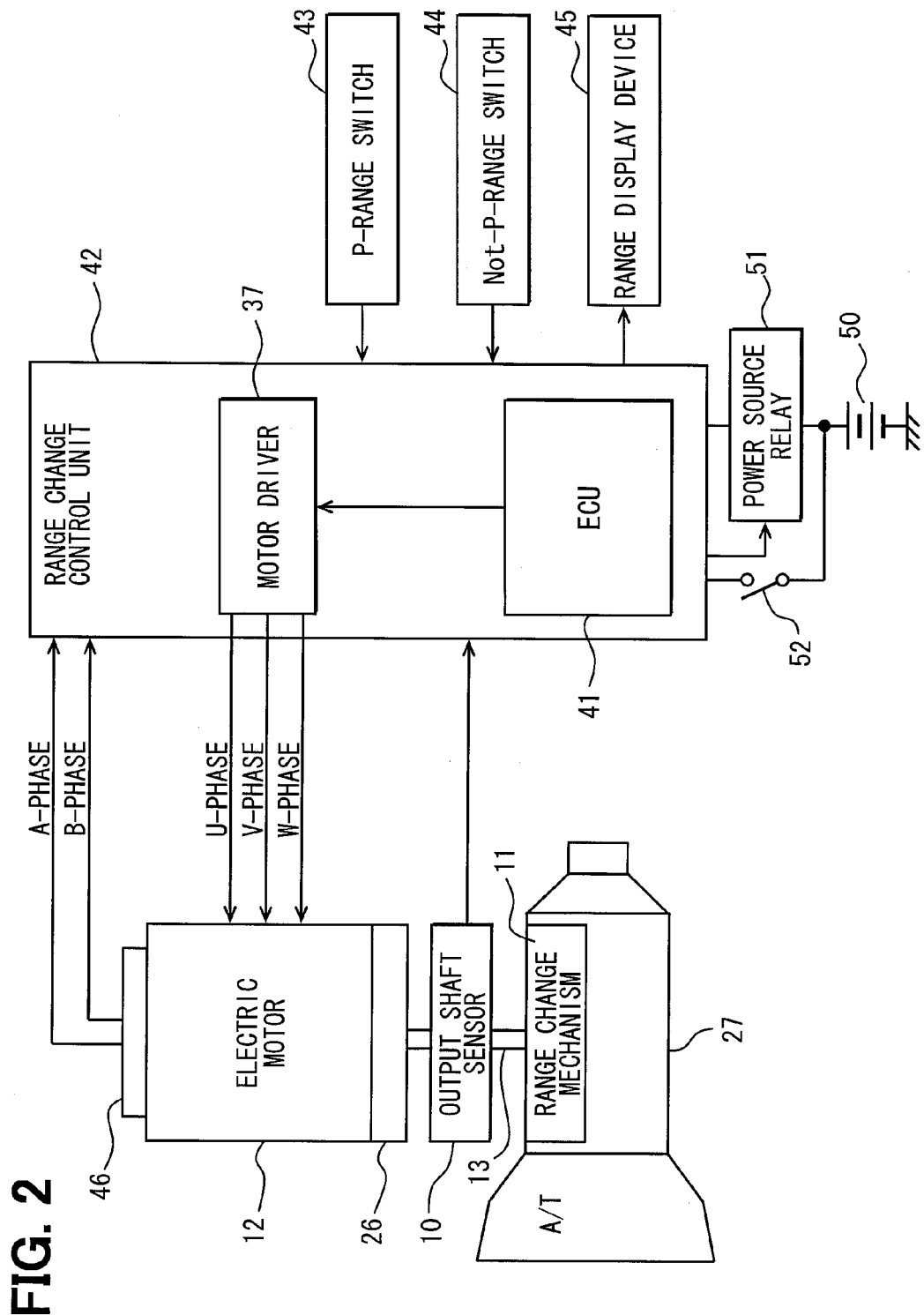
FIG. 2 is a schematic block diagram showing a structure of a motor control system for the shift-range changing device.
Figure 3A:
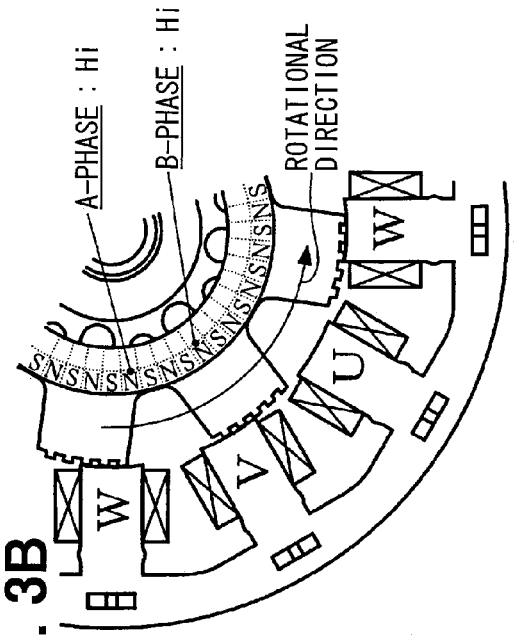
FIGS. 3A to 3D are schematic views for explaining a determining process for a success case and a failure case of a learning process in an initial operation.
Figure 3B:
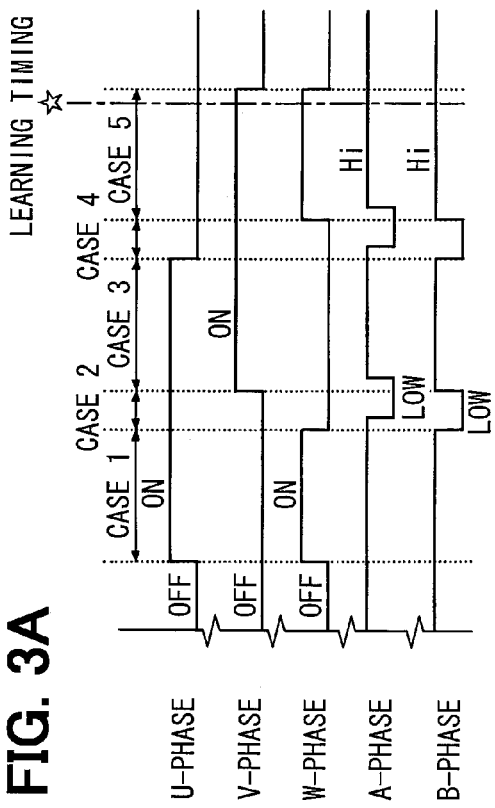
Figure 3C:
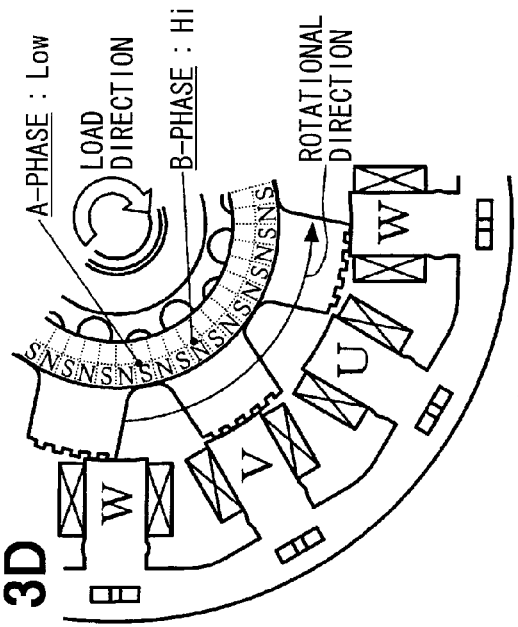
Figure 3D:
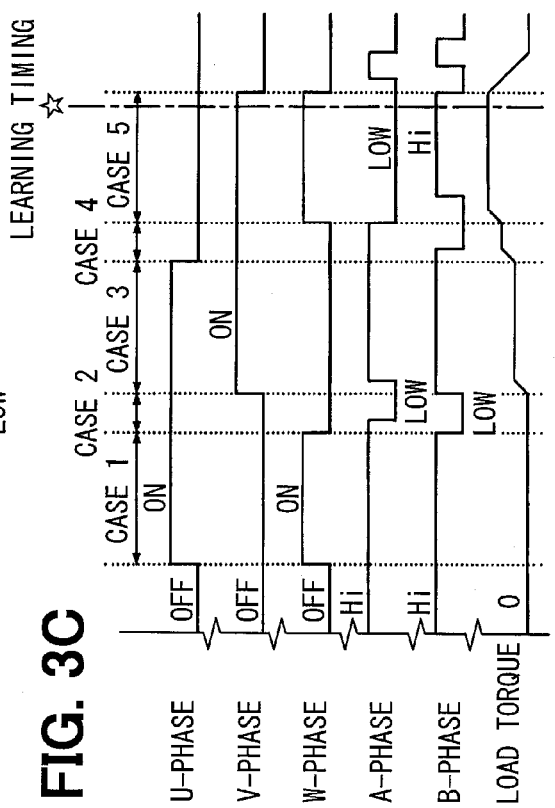

A structure of the shift-range changing device 11 will be explained with reference to FIG. 1 and FIG. 2.

The shift-range changing device 11 is a device for changing a gear range of the automatic transmission apparatus 27 (FIG. 2) to one of the gear ranges, such as, a parking range (P), a reverse range (R), a neutral range (N), and a drive range (D). An electric motor 12, which is a driving source of the shift-range changing device 11, is composed of a synchronous motor, such as, a switched reluctance motor (SR motor) and houses a speed reduction gear 26 (FIG. 2). An output-shaft sensor 10 (FIG. 2) is provided at an output shaft 13 of the speed reduction gear 26 for detecting a rotational angle of the output shaft 13. A detent lever 15 is fixed to the output shaft 13.

A parking rod 18 of an L-letter shape is connected to the detent lever 15. A conical member 19 formed at a forward end of the parking rod 18 is in contact with a locking lever 21. The locking lever 21 is rotated at a shaft 22 in accordance with a position of the conical member 19. In other words, the locking lever 21 is moved in a vertical direction (in an upward or a downward direction), so that it locks or unlocks a parking gear 20. The parking gear 20 is provided at a drive shaft of the automatic transmission apparatus 27. When the parking gear 20 is locked by the locking lever 21, driving wheels of the vehicle are maintained in a condition (a parking condition) that the driving wheels cannot be rotated.

A detent spring 23 is fixed to a support base 17 for holding the detent lever 15 at a position for the parking range (hereinafter, the P-range) and at other positions for the other ranges, such as the drive range and so on (hereinafter, the Not-P-range). When an engaging portion 23a provided at a forward end of the detent spring 23 is inserted into (engaged with) a P-range holding recess 24 of the detent lever 15, the detent lever 15 is held at a P-range position. When the engaging portion 23a is inserted into (engaged with) a Not-P-range holding recess 25 of the detent lever 15, the detent lever 15 is held at a Not-P-range position. The detent lever 15 and the detent spring 23 form a detent mechanism 14 for holding a rotational position of the detent lever 15 at respective range positions.

When the shift range is in the P-range, the parking rod 18 is moved in a direction closer to the locking lever 21, so that a thicker portion of the conical member 19 pushes up the locking lever 21. A projection 21a of the locking lever 21 is brought into an engagement with the parking gear 20 so as to lock the parking gear 20. As a result, the drive shaft of the automatic transmission apparatus 27 is held in the locked condition (that is, the driving wheels are held in the parking condition).

When the shift range is in the other ranges than the P-range (in the Not-P-range), the parking rod 18 is moved in a direction away from the locking lever 21, so that the thicker portion of the conical member 19 is brought out of contact with the locking lever 21. Namely, the locking lever 21 is moved in the downward direction, so that the projection 21a of the locking lever 21 comes out of the engagement with the parking gear 20. The locked condition of the parking gear 20 is thereby released and the drive shaft of the automatic transmission apparatus 27 is maintained in a condition that the drive shaft is rotatable (in a condition that the vehicle can move).

According to the present embodiment, the output-shaft sensor 10 is composed of a rotational angle sensor (for example, a potentiometer) for outputting an output voltage depending on the rotational angle of the output shaft 13 of the speed reduction gear 26 of the electric motor 12. Based on the output voltage, it is possible to detect and confirm a current rotational angle of the output shaft 13, namely it is possible to detect a current shift range, that is, either in the P-range or the Not-P-range.

An encoder 46 (a motor position detecting device) is provided in the electric motor 12 for detecting a rotational angle (a rotational position) of a rotor thereof. The encoder 46 is, for example, composed of a magnetic type rotary encoder. The encoder 46 generates pulse signals of A-phase and B-phase for predetermined angular intervals in synchronism with the rotation of the rotor of the electric motor 12. The pulse signals are outputted to a control device 42 for changing the shift range (hereinafter, a range-change control unit 42). A microcomputer 41 (hereinafter, ECU) of the range-change control unit 42 includes an encoder counter, which counts both of rising edges and falling edges of the pulse signals of the A-phase and B-phase from the encoder 46. The ECU 41 changes current-supply phases of the electric motor 12 in a predetermined order by a motor driver circuit 37, depending on a count value of the encoder counter (hereinafter, an encoder counter value), so that the electric motor 12 is driven to rotate.

A structure for power supply to the electric motor 12 may be formed by two systems, each including the three-phase stator coils (U-phase, V-phase and W-phase coils) and the motor driver circuit 37. When one of the systems becomes out of order, the power supply can be done by the other system so that the electric motor 12 is continuously rotated.

The ECU 41 determines a rotational direction of the electric motor 12 based on an order of generation of the pulse signals of the A-phase and B-phase. In a case of the rotation in a forward direction (that is, the rotation in a direction from the P-range to the Not-P-range), the encoder count value is increased (counted up). In a case of the rotation in a backward direction (that is, the rotation in a direction from the Not-P-range to the P-range), the encoder count value is decreased (counted down). According to such a process, it is possible to maintain a relationship between the encoder count value and the rotational angle of the electric motor 12, when the electric motor 12 is rotated in either direction of the forward or the backward direction. Accordingly, when the electric motor 12 is rotated in either of the forward direction or the backward direction, the ECU 41 can detect the rotational angle of the electric motor 12 based on the encoder count value and carry out the current supply to such stator coil, the phase of which corresponds to the rotational angle, so as to rotate the electric motor 12.

A P-range switch 43 is provided to input to the range-change control unit 42 an operation signal for operating the shift range to the P-range. A Not-P-range switch 44 is provided to input to the range-change control unit 42 an operation signal for operating the shift range to the Not-P-range. The electric motor 12 is rotated depending on the shift range selected by the switching operation of the P-range switch 43 or the Not-P-range switch 44, so that the shift range is changed to the selected range. The shift range thus changed is displayed in a range display device 45 provided in an instrument panel (not shown) of the vehicle.

A battery 50 (an electric power source) mounted in the vehicle is connected to the range-change control unit 42 via a power-source relay 51. An ON/OFF operation of the power-source relay 51 is carried out when an ignition switch 52 (a power-source switch) is manually operated to an ON position or to an OFF position. When the ignition switch 52 is turned on, the power-source relay 51 is switched on so that the electric power is supplied from the battery 50 to the range-change control unit 42. When the ignition switch 52 is turned off, the power-source relay 51 is switched off to cut off the power supply to the range-change control unit 42.

The encoder count value is memorized in a memory device (RAM) of the ECU 41. When the power supply to the ECU 41 is cut off, the encoder count value disappears from the memory device. Therefore, the encoder count value (that is, zero "0") shortly after the power supply to the ECU 41 does not always correspond to an actual rotational position of the electric motor 12 (an actual current-supply phase). It is, therefore, necessary to make the encoder count value to correspond to the actual rotational position of the electric motor 12 (to correspond to the actual current-supply phase) after the power supply to the ECU 41, so as to change the current-supply phase depending on the encoder count value.

According to the present embodiment, an initial operation of the range-change control unit 42 is carried out shortly after the power supply to the ECU 41 in the following manner. The change of the current-supply phase of the electric motor 12 is carried out in an open-loop control at a predetermined time schedule for one cycle. During the initial operation, edges of the pulse signals from the A-phase and the B-phase of the encoder 46 are counted, so as to learn the relationship between the rotational position of the electric motor 12 and the current-supply phase. Then, in a normal operation following the initial operation, the current-supply phase is decided based on the learning result at the end of the initial operation and the encoder count value.

A learning process for the initial operation is carried out as below. When the electric power is supplied to the ECU 41 at the shift range of the P-range, the change of the current-supply phase is carried out at the predetermined time schedule for one cycle in an order of, for example, the UW-phases, the U-phase, the UV-phases, the V-phase, the VW-phases, the W-phase and the UW-phases, so that the electric motor 12 is rotated in the forward direction.

On the other hand, when the electric power is supplied to the ECU 41 at the shift range of the Not-P-range, the initial operation is carried out as below. The change of the current-supply phase is carried out at the predetermined time schedule for one cycle in an order of, for example, the UV-phases, the U-phase, the UW-phases, the W-phase, the VW-phases, the V-phase and the UV-phases, so that the electric motor 12 is rotated in the backward direction, that is, the direction from the Not-P-range to the P-range.

In the above initial operation, a time duration "T1" for the power supply to the stator coils of one phase (hereinafter, one-phase winding) is made shorter than a time duration "T2" for the power supply to the stator coils of two phases (hereinafter, two-phase windings). For example, the time duration "T1" is 10 ms, while the time duration "T2" is 100 ms. In a case of the power supply to the one-phase winding, a rotational torque generated at the electric motor 12 is small. The rotor of the electric motor 12 is thereby vibrated. Therefore, the time duration "T1" for the power supply to the one-phase winding is made shorter, so that the current-supply phase is rapidly changed to the two-phase windings, even after the rotational position and the current-supply phase get into synchronization in the initial operation. As a result, the vibration of the rotor is terminated in a short time period and the output of the encoder 46 is stabilized.

When the change of the current-supply phase is done for one cycle in the initial operation, the rotational position of the electric motor 12 will surely get into synchronization with one of the current-supply phases by the end of the initial operation of one cycle. Then, the electric motor 12 is rotated in synchronism with the change of the current-supply phase and the pulse signals of the A-phase and the B-phase are outputted from the encoder 46 in synchronism with the rotation of the electric motor 12.

During the initial operation, the ECU 41 of the range-change control unit 42 counts both of the rising edges and falling edges of the pulse signals of the A-phase and B-phase from the encoder 46. Therefore, it is possible to detect an amount of the rotational angle (the actual rotational amount), for which the electric motor 12 has been actually rotated in synchronism with the change of the current-supply phase by the end of the initial operation, based on the encoder count value at the end of the initial operation. In other words, it is possible to detect a number of changes of the current-supply phase (a difference amount for the current-supply phase) for a period to such a timing, at which the rotation of the electric motor 12 actually gets into synchronization with the change of the current-supply phase. As a result, it is possible to learn a correction value for the difference amount for the current-supply phase with respect to the encoder count value (hereinafter, the correction value for the phase difference), based on the number of changes of the current-supply phase (the difference amount for the current-supply phase) by the time until the rotation of the electric motor 12 actually gets into synchronization with the change of the current-supply phase.

When the target range position is changed by the operation of the P-range switch 43 or the Not-P-range switch 44 after the initial operation, the encoder count value at that timing is corrected by the correction value for the phase difference. Then, the current-supply phase is changed depending on the corrected encoder count value, so as to rotate the electric motor 12 to a position corresponding to the target range position (that is, to a target encoder count value). The range position is thus changed to the target range position.

In some of the cases, the ECU 41 of the range-change control unit 42 may happen to be automatically reset from any causes (for example, instantaneous drop of power supply voltage, electric power failure, noises and so on) during the normal operation after the initial operation. The ECU 41 is then re-started. When the ECU 41 is reset, a learning value (a memorized value in a memory device) of the correction value for the phase difference (that is, the difference amount for the current-supply phase) as well as the encoder count value disappears. It is, therefore, necessary to carry out the initial operation (the learning process) once again to calculate the correction value for the phase difference through the initial operation in the case of re-start of the ECU 41 after the reset.

In a normal operation, the initial operation is carried out in a condition that the rotation of the rotor of the electric motor 12 is stopped, when the electric power is supplied to the ECU 41. However, in some of cases of re-starting the ECU 41 after the reset, the initial operation will be carried out in a condition that the rotor of the electric motor 12 is still in its rotation due to its inertia. When the initial operation is carried out in the condition that the rotor is rotating, the learning process for the correction value of the phase difference may fail, because the electric motor 12 is continuously rotated due to the inertia even in a case in which the rotational position does not correspond to the current-supply phase. When the learning process fails (the process is ended due to an error or the learning value becomes wrong), it may happen that the electric motor 12 cannot be correctly rotated in the normal operation following the initial operation. This kind of situation may also happen when a vehicle driver tries to turn on the ignition switch 52 again before the rotation of the electric motor 12 has not yet been completely stopped since the turn-off operation of the ignition switch 52.

Figure 4:
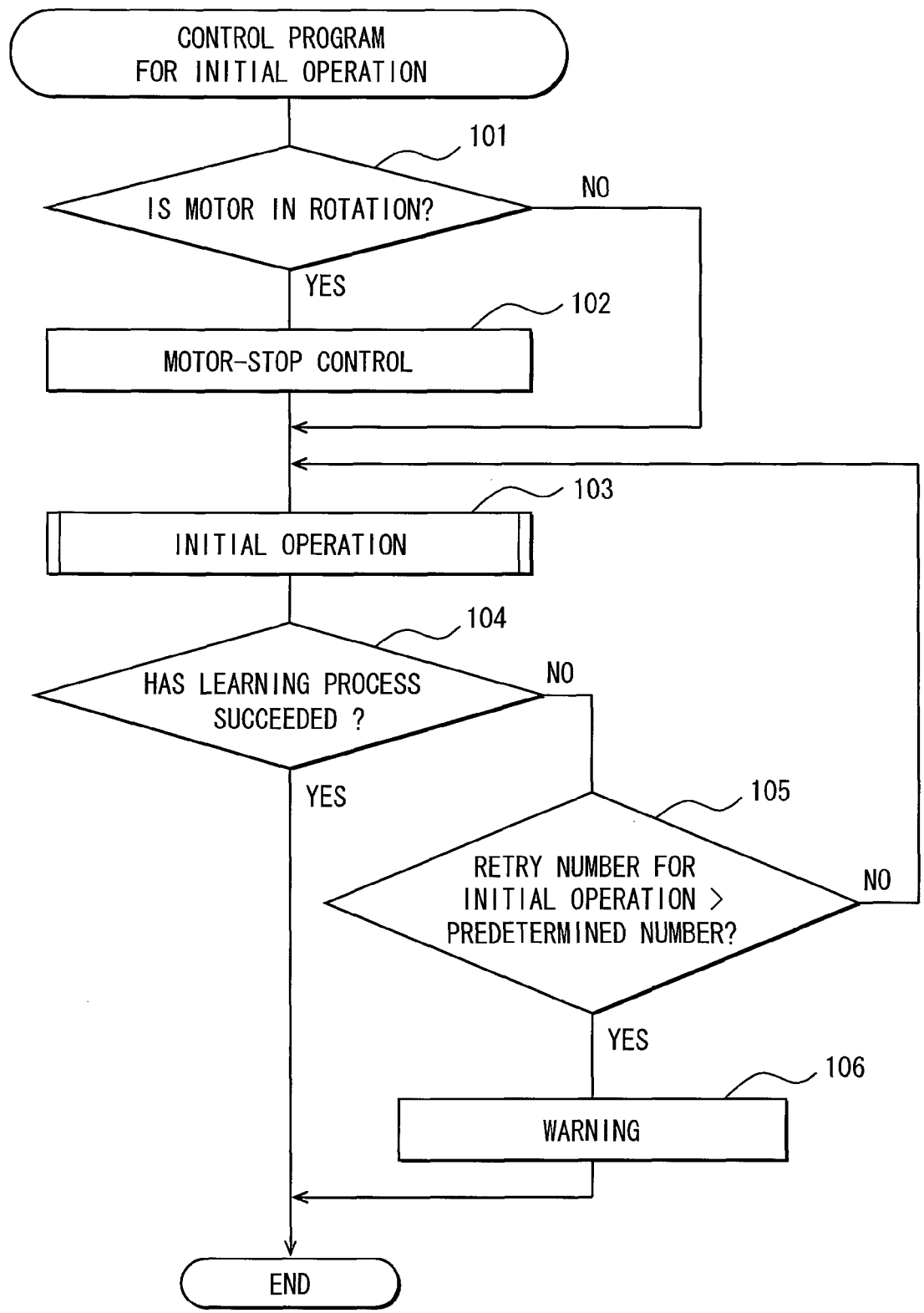
FIG. 4 is a flowchart showing a control process for the initial operation.

According to the present embodiment, a control program for the initial operation is carried out by the ECU 41 of the range-change control unit 42, as explained below with reference to FIG. 4, in order to determine whether the electric motor 12 is in its rotation or not before carrying out the initial operation when the ECU 41 is started up. When the ECU 41 determines that the electric motor 12 is in its rotation, a motor-stop control is carried out so as to stop the rotation of the electric motor 12 before the initial operation. In other words, when the electric motor 12 is still being rotated by its inertia in the case of the computer reset or the repeated turn-on operation of the ignition switch (the power supply in a short time interval), the rotation of the electric motor 12 is completely stopped by the motor-stop control and then the initial operation is carried out for learning the correction value of the phase difference. Accordingly, it is possible to surely prevent a failure of the learning process for the correction value of the phase difference.

According to the present embodiment, the ECU 41 determines whether the electric motor 12 is in its rotation at the start-up of the ECU 41, based on the encoder count value.

When the rotation of the electric motor 12 is stopped at the start-up of the ECU 41, an initial value for the encoder count value is reset as zero "0" and maintained at the value of zero "0". On the other hand, when the electric motor 12 is being rotated due to its inertia at the start-up of the ECU 41, the encoder count value is increased or decreased from the value of zero "0" depending on the rotational angle (the rotational amount) after the start-up of the ECU 41. Therefore, the ECU 41 determines that the rotation of the electric motor 12 is stopped when the encoder count value after the start-up of the ECU 41 is maintained at the initial value of zero "0". The ECU 41 determines that the electric motor 12 is being rotated when the encoder count value after the start-up is increased or decreased from the initial value of zero "0".

In addition, when the ECU 41 determines that the electric motor 12 is being rotated at the start-up of the ECU 41, the motor-stop control is carried out in such a way that the electric power is supplied at the same time to windings of two phases (the two-phase windings of the stator coils) among the three phases of the electric motor 12. Then, the initial operation is carried out in such a way that the first current-supply phase(s) of the initial operation is selected as such current-supply phases for which the electric power is supplied for the motor-stop control. Since the power supply to the windings of two phases can produce a larger torque than the power supply to the windings of the one phase, a performance of the motor-stop control can be increased by supplying the electric power to the windings of the two phases.

In addition, when the current-supply phases for the motor-stop control are selected so that the current-supply phases for the motor-stop control and the initial operation are the same to each other, the electric motor 12 is continuously held at the stop condition by the first power supply in the initial operation (by the first magnetic excitation at the windings of the two phases). Therefore, it is possible to more surely prevent the rotation of the electric motor 12 by its inertia in the initial operation. According to the present embodiment, the electric power is also supplied to the windings of the two phases at the end of the initial operation, so as to increase the stopping performance of the electric motor 12 even at the end of the initial operation.

The windings of the two phases, to which the electric power is supplied in the motor-stop control, may be decided based on the encoder count value. Alternatively, the windings of the two phases may be decided in advance, independently of the encoder count value.

The initial operation by the ECU 41 is carried out shortly after the electric power is supplied to the ECU 41, that is, when the ignition switch 52 is turned on. In a vehicle, which is driven to move by an engine, the initial operation for the range-change control unit often overlaps a cranking operation by a starter motor for the engine. When the electric power is supplied to an electric load, such as, the starter motor having a large power consumption, during the initial operation for the range-change control unit, the power-supply voltage may be largely decreased in the initial operation and thereby the torque of the electric motor 12 may become insufficient. Then, the learning process for the correction value of the phase difference by the initial operation may fail (the process is ended due to the error or the learning value becomes wrong). When the learning process of the initial operation fails, it is not possible, at the end of the initial operation, to correct the phase difference between the encoder count value and the rotational position (the current-supply phase) of the electric motor 12. As a result, the electric motor 12 cannot be correctly rotated.

According to the present embodiment, the ECU 41 monitors whether the learning process of the initial operation has succeeded or failed. When the learning process of the initial operation has failed, the initial operation will be carried out again.

The ECU 41 determines whether the learning process of the initial operation has succeeded or failed in the following manner. In the initial operation, the electric power is alternately supplied to the windings of one phase and to the windings of the two phases so as to rotate the electric motor 12. The initial operation is ended at a position, at which the electric power is supplied to the windings of the two phases. When a pattern of the signal of the A-phase and a pattern of the signal of the B-phase from the encoder 46 do not correspond to the respective patterns at the power supply to the windings of the two phases, the ECU 41 determines that the learning process of the initial operation has failed.

More in detail, as shown in FIGS. 3A to 3D, when the rotor of the electric motor 12 is normally rotated and the initial operation is terminated, the rotor is stopped at such a position, at which the electric power is supplied to the windings of the two phases. Then, both of the A-phase signal and the B-phase signal of the encoder 46 become high level signals "Hi" at the end of the initial operation (that is, a learning timing), regardless to which of two phases among the UW-phases, the UV-phase and the VW-phases, the electric power is supplied. On the other hand, when the rotor of the electric motor 12 is not normally rotated because any load is applied to the rotor, one of or both of the A-phase signal and the B-phase signal of the encoder 46 become low level signals "Low", at the end of the initial operation.

Based on the above relationship, the ECU 41 determines that the result of the learning process is correct, when both of the A-phase signal and the B-phase signal are in the high level "Hi" at the end of the initial operation. On the other hand, the ECU 41 determines that the result of the learning process is not correct, when one of or both of the A-phase signal and the B-phase signal are in the low level "Low" at the end of the initial operation.

The above control of the initial operation is carried out in accordance with a control program (shown in FIG. 4) stored in the ECU 41 of the range-change control unit 42. The control program of FIG. 4 is started when the ECU 41 is reset or when the electric power is supplied (when the power source relay 51 is switched on).

When the control program is started, the ECU 41 determines at first, at a step 101, whether the rotor of the electric motor 12 is being in rotation or not, based on the encoder count value after the start-up of the ECU 41. The ECU 41 determines that the rotation of the rotor is stopped, when the encoder count value is maintained at the initial value of zero "0". The ECU 41 determines that the rotor is still in its rotation, when the encoder count value is increased or decreased from the initial value of zero "0".

When the ECU 41 determines at the step 101 that the rotor of the electric motor 12 is being in rotation, the process goes to a step 102 so as to carry out the motor-stop control. In the motor-stop control, the electric power is supplied at the same time to the windings of two phases among the thee phase windings of the electric motor 12, to thereby stop the rotation of the rotor. After the power supply to the windings of the two phases has been carried out for a predetermined time period, the process goes to a step 103 to carry out the initial operation.

When the ECU 41 determines at the step 101 that the rotation of rotor is stopped, the process goes to the step 103 without doing the motor-stop control in order to carry out the initial operation.

After the completion of the initial operation, the process goes to a step 104 to determine whether the learning process for the correction value of the phase difference has succeeded in the initial operation or not. When Yes, the process goes to an end. When the ECU 41 determines that the learning process for the correction value of the phase difference has failed, the process goes to a step 105 to determine whether a number of retry for the initial operation exceeds a predetermined number or not. When the retry number does not exceed the predetermined number, the process goes back to the step 103 to carry out the initial operation once again. And the ECU 41 determines again at the step 104 whether the learning process for the correction value of the phase difference has succeeded in the initial operation or not.

As above, the initial operation is carried out several times until the learning process for the correction value of the phase difference succeeds. When the retry number for the initial operation exceeds the predetermined number, the ECU 41 determines that there is any abnormal condition and thereby the electric motor 12 cannot be normally rotated. The process goes to a step 106 to display a warning in a display portion of an instrument panel of a vehicle or to turn on or blink a warning lamp, to inform a vehicle driver of such abnormal condition. Then, the process goes to the end.

According to the present embodiment, the ECU 41 of the range-change control unit 42 determines at first whether the rotor of the electric motor 12 is in rotation or not, after the ECU 41 is started but before the initial operation is carried out. When the ECU 41 determines that the rotor of the electric motor 12 is stopped, the initial operation is immediately carried out. However, when the ECU 41 determines that the rotor of the electric motor 12 is still in its rotation, the initial operation will be carried out only after the motor-stop control is completed. Accordingly, when the rotor of the electric motor 12 is rotated by its inertia in the case of the reset of the ECU or in the case that the electric power is supplied again to the ECU shortly after the turn-off of the ignition switch, the initial operation is carried out after the rotation of the rotor of the electric motor 12 is stopped. It is possible to prevent a failure of the learning process for the correction value of the phase difference. It is possible to increase reliability for the learning process in the initial operation for the correction value of the phase difference.

Other Embodiments and/or Modifications

In the above embodiment, the ECU 41 determines whether the electric motor 12 is in rotation or not, based on the encoder count value after the start-up of the ECU 41. It is possible to determine whether the electric motor 12 is in rotation or not, based on detection value of the output shaft sensor 10 (the rotational angle sensor).

The encoder 46 should not be limited to the magnetic type encoder. An encoder of an optical type or an encoder of a brush type may be used. The encoder 46 should not be limited to such an encoder outputting the A-phase signal and the B-phase signal. An encoder, which outputs a Z-phase signal for correction (for index) in addition to the A-phase and B-phase signals, may be used.

In the above embodiment, the switched reluctance motor (the SR motor) is used as the electric motor 12. Asynchronous electric motor of a brushless type, according to which current-supply phase is sequentially changed by detecting a rotational position of a rotor based on the encoder count value, can be also used as the electric motor 12. Any other synchronous electric motor of the brushless type may be used as the electric motor 12.

In the above embodiment, the shift-range changing device has the structure for changing ranges between the P-range and the Not-P-range. The present disclosure can be also applied to such a shift-range changing device, according to which the shift range is changed to respective positions for P-range, R-range, N-range and D-range of the automatic transmission device. In such a case, a range-change valve and a manual valve of the automatic transmission apparatus are changed depending on the rotational movement of the detent lever 15.

The present disclosure should not be limited to the automatic transmission apparatus (including AT, CVT, DCT, etc.) but can be applied to a shift-range changing device for a speed reduction apparatus of an electric vehicle.

The present disclosure can be further applied to various kinds of position changing devices, which have synchronous electric motors of the brushless type (such as, the SR motor) as the driving source. The present disclosure can be further modified in various manners without departing from the spirit of the present disclosure.

What is claimed is:

1. A motor control system comprising:

an electric motor for driving a controlled object;

an encoder for outputting pulse signals at predetermined angular positions in synchronism with rotation of the electric motor; and a motor control unit having an encoder counter for counting the pulse signals from the encoder to calculate an encoder count value, wherein the motor control unit carries out an initial operation after a start-up of the motor control unit, so that current-supply phase of the electric motor is changed in an open-loop control, wherein the motor control unit carries out a learning process in the initial operation in order to learn a correction value of a phase difference between the current-supply phase and the encoder count value, wherein, in a normal motor operation after the initial operation, the motor control unit corrects the encoder count value by the correction value of the phase difference, wherein the motor control unit controls power supply to the electric motor so that the current-supply phase is sequentially changed depending on corrected encoder count value, in order to rotate the electric motor to a target position, wherein the motor control unit determines whether the electric motor is being rotated or not, after the start-up of the motor control unit but before the initial operation, and wherein the motor control unit carries out a motor-stop control, when the motor control unit determines that the electric motor is still being rotated, so as to stop rotation of a rotor of the electric motor before the initial operation.

2. The motor control system according to the claim 1, wherein the motor control unit determines whether the electric motor is being rotated or not, after the start-up of the motor control unit, based on the encoder count value.

3. The motor control system according to the claim 1, wherein in a case the motor control unit determines that the electric motor is being rotated, after the start-up of the motor control unit, the motor control unit carries out the motor-stop control in a following manner;

two-phase power supply is carried out, so that the electric power is supplied at the same time to windings of two phases among three-phase windings of the electric motor; and first current-supply phases for the initial operation are set to coincide with current-supply phases for the motor-stop control.

4. The motor control system according to the claim 1, wherein the controlled object is a shift-range changing device for changing shift range of an automatic transmission apparatus.

* * * * *